United States Patent [19]
Zulaski et al.

[11] Patent Number: 5,303,112
[45] Date of Patent: Apr. 12, 1994

[54] FAULT DETECTION METHOD AND APPARATUS

[75] Inventors: John A. Zulaski, Mt. Prospect; Thomas J. Tobin, Northbrook, both of Ill.

[73] Assignee: S & C Electric Company, Chicago, Ill.

[21] Appl. No.: 604,700

[22] Filed: Oct. 26, 1990

[51] Int. Cl.$^5$ .............................................. H02H 3/08
[52] U.S. Cl. ........................................ 361/67; 361/68; 361/71; 361/79
[58] Field of Search ...................... 361/67, 68, 65, 66, 361/71, 72, 93; 340/652, 310 R, 310 A

[56] References Cited

U.S. PATENT DOCUMENTS

| | | | |
|---|---|---|---|
| 3,152,286 | 10/1964 | Field et al. | |
| 3,331,921 | 7/1967 | Neiswinter et al. | 178/69 G |
| 4,057,785 | 11/1977 | Furniss et al. | 340/163 |
| 4,535,409 | 8/1985 | Jindrick et al. | 364/481 |
| 4,587,588 | 5/1986 | Goldstein | 361/54 |
| 4,835,651 | 5/1989 | Li et al. | 361/68 |
| 4,916,628 | 4/1990 | Kugler | 364/492 |
| 4,972,290 | 11/1990 | Sun et al. | 361/64 |

Primary Examiner—Steven L. Stephan
Assistant Examiner—B. Davidson
Attorney, Agent, or Firm—James V. Lapacek

[57] ABSTRACT

Method and apparatus are provided responsive to the circuit parameters at one or more locations of an electrical power transmission and/or distribution network for detecting protective device operation. The detection of the protective device operation is utilized to locate faults and also to ascertain the status of protective devices. This information is useful in automated power systems for desirable isolation and sectionalizing of faults for optimum restoration of the network. A fault detection unit of the present invention is responsive to sensed circuit parameters and provides at least first and second outputs indicative of protective device operations that open the circuit. The first output is provided upon the occurrence of an overcurrent followed by the loss of a circuit parameter, such as voltage, for a specified time duration. In a preferred arrangement, the timing for a specified time duration is started when the overcurrent ends. Thus, rapid detection is achieved since the specified time duration need not include the maximum operating time of the protective device. The second output is provided if the conditions for the first output are satisfied and the loss of the circuit parameter continues for a specified extended time interval corresponding to the sequence of operation of the upstream protective device so as to establish protective device operation. For example, the first output in one illustrative arrangement corresponds to the opening of a recloser while the second output corresponds to the lockout of the recloser. In a preferred arrangement, a third output is provided upon the occurrence of an overcurrent for a specified time duration. A fourth output is provided upon the occurrence of an overcurrent for a specified time duration and the presence of voltage after the occurrence of the first output for purposes of detecting downstream fuse operation on power systems utilizing fuse-saving arrangements.

42 Claims, 6 Drawing Sheets

FAULT DETECTION METHOD AND APPARATUS

BACKGROUND OF THE INVENTION

1. Field of the Invention

The present invention relates generally to the field of electrical power transmission and distribution systems and more particularly to method and apparatus for determining protective device operations and locating fault conditions via the monitoring and detection of system conditions obtained from sensed circuit parameters.

2. Description of the Related Art

In electrical power distribution systems, various customers and users are supplied with electricity in networks such that power may be provided to the users from more than one system network path or more than one source. In this manner, faults may be isolated via sectionalizing while maintaining power delivery to the users who are not in the immediate vicinity of the faulted section; i.e., where the fault occurs. To achieve this purpose, a variety of devices are arranged throughout the distribution system at appropriate locations to efficiently provide for the interruption and isolation of faults. These devices include fuses, circuit breakers, reclosers, sectionalizers, and remotely and locally operated distribution switches.

The circuit breakers are located near the sources of the supply to the distribution system. Additionally, reclosers are located farther (downstream) from the points of supply at the breakers. Breakers and reclosers include the sequenced operation of reclosing cycles in the presence of overcurrents whereby the delivery of electric power is interrupted via the opening of the circuit for predetermined intervals followed by the closing of the circuit. Hereafter, breakers and reclosers are utilized interchangeably. The reclosing sequence continues until either the fault is cleared or a predetermined number of reclosing operations have taken place (e.g., four) whereupon the recloser locks out to continuously open the circuit until appropriate action can be taken by maintenance personnel to repair the circuit. In this manner, momentarily occurring overcurrents or fault conditions which are self-clearing allow the restoration and maintenance of power delivery to the system without permanent opening (lock out) of the circuit.

Farther downstream from the source of supplies of the network, sectionalizers may be provided which are arranged to count the number of recloser operations. After a particular number of counts, for example three where the recloser has a total of four sequences of operation, the sectionalizer will open during the recloser open time so as to isolate a particular fault and allow the recloser to successfully reclose. At other locations, such as in branch sections or feeder lines, fuses may be provided which are coordinated with the other protective devices to sense overcurrents and faults so as to interrupt current before the operation of the circuit breaker, reclosers, and/or sectionalizers. Additionally, distribution switches capable of remote or local operation are provided at various points along the network to provide suitable isolation, sectionalizing, and re-routing of power via different sources.

Information about system operation and control of the system can be provided from each distribution switch or circuit point to a master station via suitable communication channels—radio, fiber-optics, land lines, or power-line carrier. For example, information can be obtained corresponding to the lockout condition of particular breakers as well as the voltage and current at particular points in the network. Additionally, fault indicators can be provided at suitable points to report as to the location of the fault on the network. Control of the system is available via the remote operation of sectionalizing devices equipped with remote terminal units (RTU's).

While particular information about parameters at the remote locations is available to a master station, the lockout condition in some systems is not readily discernable, and the determination of upstream protective device operations and the location of faults is only generally ascertainable at the master station. Additionally, presently available methods can erroneously respond as a result of magnetizing inrush currents, cold-load pickup, and backfeed conditions. Thus, the location of a fault is not confidently known via the information received at the master station. Accordingly, the remote terminal units and the distribution switches along the network cannot be utilized to efficiently locate, isolate, and restore the system after the occurrence of a fault or overcurrent condition.

SUMMARY OF THE INVENTION

Accordingly, it is a principal object of the present invention to provide method and apparatus to detect the type of operation of upstream and downstream protective devices in an electrical power transmission and distribution network and to provide information for use in locating and isolating faults.

It is another object of the present invention to provide method and apparatus to detect at least three different types of protective device operations corresponding to circuit opening functions so as to distinguish between permanent circuit interruptions, successful reclosures, and faults cleared by downstream protective devices.

These and other objects of the present invention are efficiently achieved by method and apparatus that are responsive to the circuit parameters at one or more locations of an electrical power transmission and/or distribution network for detecting protective device operation. The detection of the protective device operation is utilized to locate faults and also to ascertain the status of protective devices. This information is useful in automated power systems for desirable isolation and sectionalizing of faults for optimum restoration of the network. A fault detection unit of the present invention is responsive to sensed circuit parameters and provides at least first and second outputs indicative of protective device operations that open the circuit. The first output is provided upon the occurrence of an overcurrent followed by the loss of a circuit parameter, such as voltage, for a specified time duration. In a preferred arrangement, the timing for a specified time duration is started when the overcurrent ends. Thus, rapid detection is achieved since the specified time duration need not include the maximum operating time of the protective device. The second output is provided if the conditions for the first output are satisfied and the loss of the circuit parameter continues for a specified extended time interval corresponding to the sequence of operation of the upstream protective device so as to establish protective device operation. For example, the first output in one illustrative arrangement corresponds to the opening of a recloser while the second output corresponds to the lockout of the recloser. In a preferred arrangement, a third output is provided upon the occurrence of an overcurrent for a specified time duration. A fourth output is provided upon the occurrence of an overcurrent for a specified time duration and the presence of voltage after the occurrence of the first output for purposes of detecting downstream fuse operation on power systems utilizing fuse-saving arrangements.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
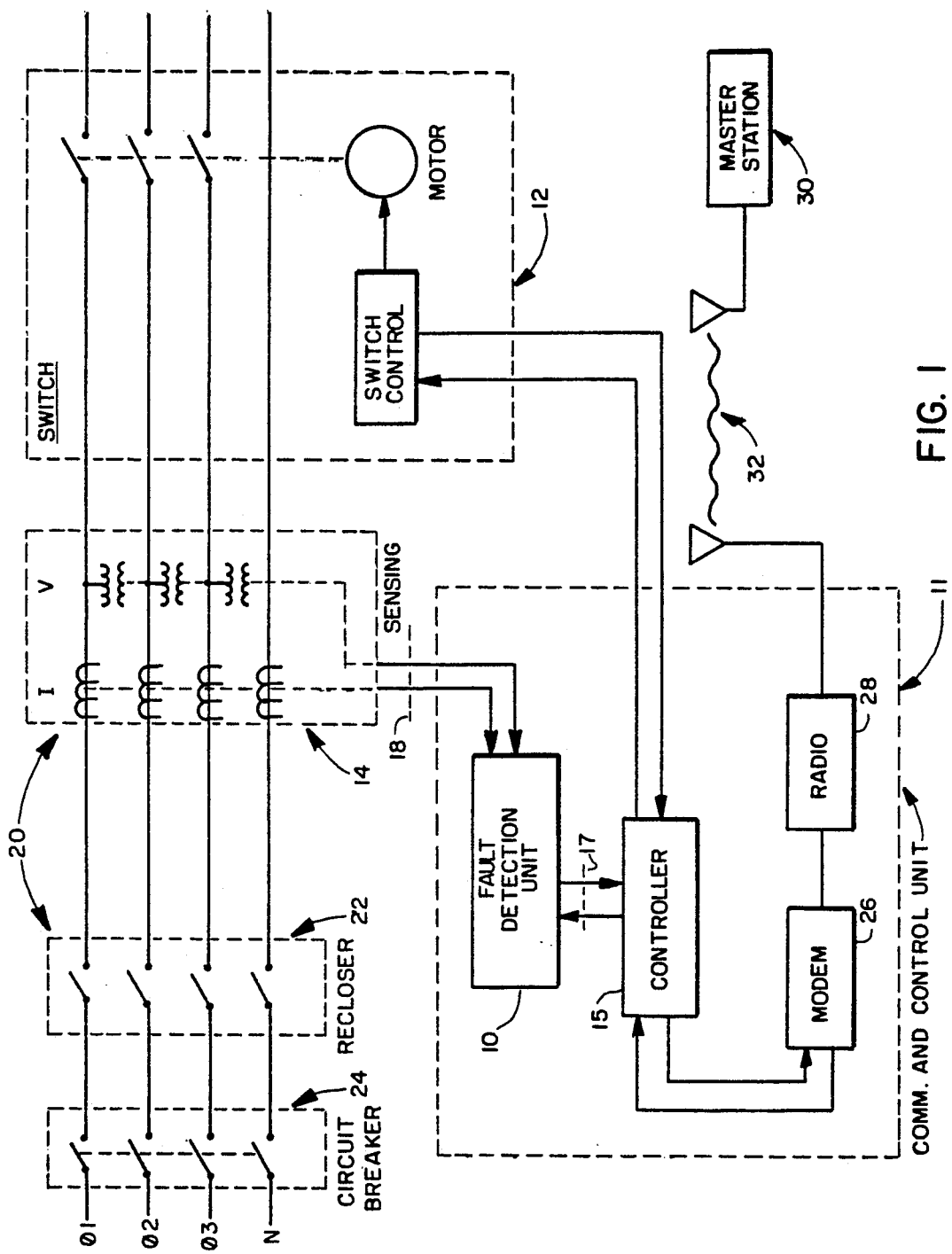
FIG. 1 is a block diagram of the apparatus for use with the present invention illustrated with an electrical power distribution system.

Referring now to FIG. 1, a fault detection unit 10 to practice the present invention is illustrated for use in a communication and control unit 11 for an electrical power distribution network 20. The fault detection unit is useful for automated distribution systems, generally referred to as a SCADA system. In a preferred illustrative arrangement, a controller 15 interfaces with the fault detection unit 10 over signal lines 17 and a three-pole group-operated switch referred to generally at 12. The fault detection unit 10 receives signals at 18 from a sensing arrangement generally referred to at 14. The signals at 18 represent circuit parameters such as the voltage and/or current for one or more phases of the lines of the distribution circuit 20.

In accordance with important aspects of the present invention, the fault detection unit 10 includes provisions responsive to the sensed signals at 18 to detect and indicate various types of operations of upstream and downstream protective devices in the distribution network 20 such as a recloser 22 or a circuit breaker 24. The fault detection unit 10 is operative in accordance with a control method and the sensed signals at 18, to detect the various operations of protective devices in and the conditions of the distribution network 20, and to provide status indications. This information is provided to the controller 15 over the signal lines 17. The controller 15 via a data modem 26 and a radio 28 transmits data to and receives data from a master station 30 via a radio link generally referred to at 32. Preferably, the fault detection unit 10 operates to independently detect conditions for each phase of the network 20.

In an illustrative arrangement, the master station 30 polls the controller 15 to cause the transmission of data to the master station 30 representing information about protective device operation and the network status information available via the fault detection unit 10. Additionally, the master station 30 transmits command signals to the controller 15 to cause operation of the switch 12; i.e., to open or close the switch. Additionally, the controller 15 is also effective to provide information about the status of the switch 12; i.e., open or closed state. The controller 15 may be implemented by suitable devices such as a programmable logic controller, a remote terminal unit (RTU), or other microprocessor or computer-controlled device.

Figure 2:
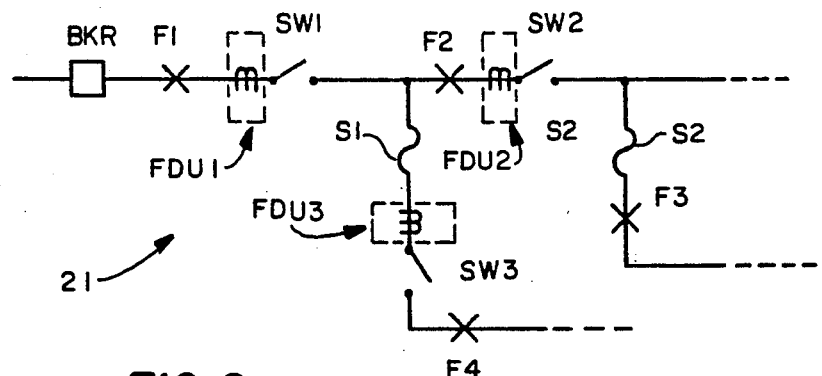
FIGS. 2 and 3 are a diagrammatic representations of electrical power distribution networks illustrating the use of the present invention.

Referring now additionally to FIG. 2, one of the fault detection units (FDU's) 10 (preferably as a component part of a communication and control unit 11) is provided at each of the illustrative locations FDU1 through FDU3 in the distribution network 21. The distribution network 21 includes protective devices such as a circuit breaker BKR and fuses S1 and S2. The points F1-F4 refer to various possible fault locations in the network 21 to illustrate how the FDU 10 of the present invention is utilized to assist in locating faults and in restoring the system via isolating faults and sectionalizing around the fault in the most efficient manner. The following Table I lists the illustrative fault locations F1-F4 and the status indications provided by the FDU's 1-3.

TABLE I

| Fault | Status | | |
| Location | SW1 | SW2 | SW3 |
| --- | --- | --- | --- |
| F1 | N | N | N |
| F2 | 1 or 2* | N | N |
| F3 | 2 or 3** | 2 or 3** | N |
| F4 | 2 or 3** | N | 1 |

*Dependent upon whether breaker successfully clears the fault or goes to lockout.
**Dependent upon whether the tap-fuse clearing time exceeds the upstream overcurrent delay time, as in a fuse-saving arrangement.

The FDU's 10 each operate in accordance with a fault detection method (of either hardware or software implementation) and respond to indicate the operation and status of the upstream protective devices. A Fault Detection Status Three indicates the occurrence at a particular FDU location of an overcurrent condition that exceeds a predetermined level and that continues for a predetermined interval. The symbol N represents a normal status indication signifying that no fault detection condition has occurred at that location. The Fault Detection Status Two represents the detection of an operation of an upstream protective device as defined by the detection of the Status Three overcurrent followed by the loss of a predetermined circuit parameter (e.g., voltage or current) for a predetermined time interval.

A Fault Detection Status One indicates that the conditions have been satisfied to establish operation of an upstream protective device to open the circuit in a lockout or permanent mode. For example, the detection of a Status Two state with the continued loss of voltage for an extended predetermined time duration establishes a Status One state.

Figure 3:
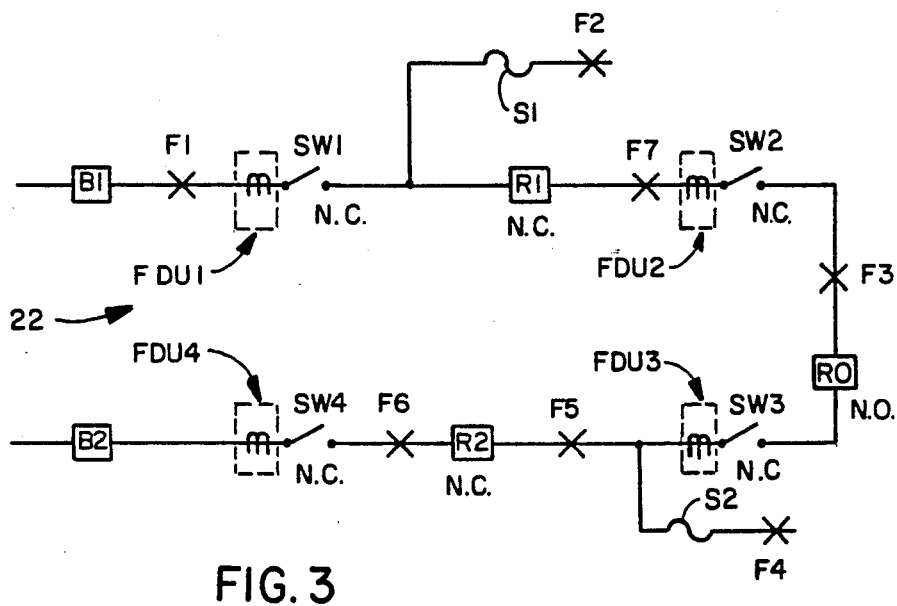

Referring now to FIG. 3 to consider the use of the present invention in a more complex network configuration, the distribution network 22 includes various well known protective devices such as circuit breakers B1,B2, reclosers R0, R1, and R2, and fuses S1,S2. In a normal configuration of this illustrative network, the circuit breakers B1 and B2 are closed, the reclosers R1 and R2 are closed, and the distribution switches SW1-SW4 at the FDU locations FDU1-FDU4 are closed. The recloser R0 is normally open and is arranged to function as an open tie recloser in the overall loop network 22.

The points F1 to F7 refer to various possible fault locations in the network 22 to illustrate how the FDU's 10 of the present invention are utilized in an automated distribution system to assist in locating faults and in restoring the system via isolating faults and sectionalizing around the fault in the most efficient manner. The following Table II lists the various possible fault locations F1-F7, the status indications provided by the FDU's 1-4, and the corresponding condition of the protective devices after automatic restoration of the network.

TABLE II

| Fault Location | Fault Detection Status At Switch | | | | Breaker/Recloser Condition After Auto Restoration | | | | |
|---|---|---|---|---|---|---|---|---|---|
| | SW 1 | SW 2 | SW 3 | SW 4 | B1 | B2 | R1 | R0 | R2 |
| F1 | N | N | 3 | 3 | O | C | O | C | C |
| F2 | 2 or 3** | N | N | N | C | C | C | O | C |
| F3 | 3 | 1 or 2* | 3 | 3 | C | C | O | O | C |
| F4 | N | N | N | 2 or 3** | C | C | C | O | C |
| F5 | 3 | 3 | N | 3 | C | C | C | O | O |
| F6 | 3 | 3 | N | 1 or 2* | C | O | C | C | O |
| F7 | 3 | N | 3 | 3 | C | C | O | O | C |

**Dependent upon whether tap fuse clearing time exceeds the upstream overcurrent delay time, as in a fuse-saving arrangement.
*Dependent upon whether breaker successfully clears the fault or goes to lockout.

Figure 4:
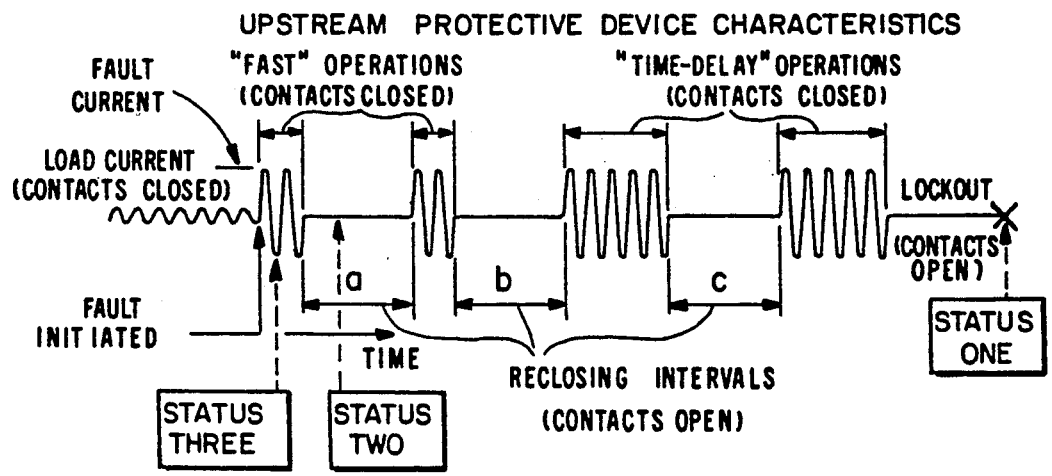
FIG. 4 is a diagrammatic representation of the operating sequence of a protective device to illustrate the operation of the present invention.

As before the FDU's 10 respond to indicate the operation and status of the upstream protective devices as illustrated. For an example of a protective device with reclose features and with reference to FIG. 4, a Status Two State with continued loss of voltage for the specified time duration establishes a Status One State. This corresponds to a loss of voltage for a period of time that exceeds the maximum reclose interval (reclosing interval). Additionally, after the detection of a Status Two, if the voltage returns prior to the maximum reclosing time that would be required to establish a Status One detection, the method of the FDU 10 monitors for the continued presence of voltage for an extended time period that exceeds the reset time operation of the upstream protective device. If the voltage returns for that reset time, the method returns to the Normal Status State. However, whenever the voltage is again lost before the conditions are satisfied to return to Normal status, the timing for the Status One time interval is again started.

Thus, in response to a fault with an upstream recloser, the FDU 10 outputs a signal Status Two indication that the recloser has opened. If the fault is cleared, the FDU 10 eventually returns to the Normal Status State even if three reclose operations are required. If the recloser locks out at the end of the specified number of reclose operations, the open state that exceeds the maximum reclose interval will be detected and a Status One will be indicated.

The status indications 1 to 3 are in a numerical order of descending priority such that Status One is the highest priority and Status Three is the lowest priority.

Considering the examples of Table II, in accordance with the features of the present invention, the FDU 10 provides information to precisely locate the fault after auto-restoration so that the appropriate distribution switches SW1-SW4 via the FDU's 1-4 can be operated to most efficiently isolate the fault via sectionalizing so as to reconfigure the network 20.

In the example of fault locations F3, F5, F6, and F7, the open tie recloser R0 is not necessarily required to be programmed to close automatically. For example, in the example F3, the fault may be sectionalized since the FDU 10 for location FDU2 specifically identifies the fault as being between SW2 and the recloser R0. Thus, the switch SW2 may be opened remotely, the recloser R1 remotely closed, and the recloser R0 remains open. If unusual conditions persist, then the R0 recloser may be closed.

Even if auto-restoration is permitted without first using the detection information to open appropriate switches, the present invention still provides isolation of the fault via automated sectionalizing based on the location of the fault. In the example F1, SW1 may be opened so that reconfiguring can then take place to close recloser R1. In F5, after R2 locks out, SW3 may be opened and R0 closed. In F6, SW4 may be opened and R2 may remain open, allowing B2 to close. In F7, after R1 locks out, SW2 may be opened and R0 closed. In F2, fuse S1 operates while in F4, fuse S2 operates.

Of course, it should also be understood that in some communication system configurations, if the master station 30 received appropriate information on a real time basis, the switches could be operated to reconfigure the system to isolate the fault so as to make the full auto-restoration sequence as set forth unnecessary.

It should also be noted that the provision of the Status Three in various arrangements is either optional or selectively programmable as to being polled or indicated as monitored data. For example, in times of emergency situations such as storms, etc., the Status Three detection may not be desired. However, during times where analysis and maintenance personnel have the opportunity to attempt to locate recurring momentary fault conditions, the Status Three detection is very desirable to locate such faults. Additionally, in a specific embodiment, the communication and control unit 11 is arranged to provide only the highest status currently being detected; i.e., the lowest status number.

Figure 5:
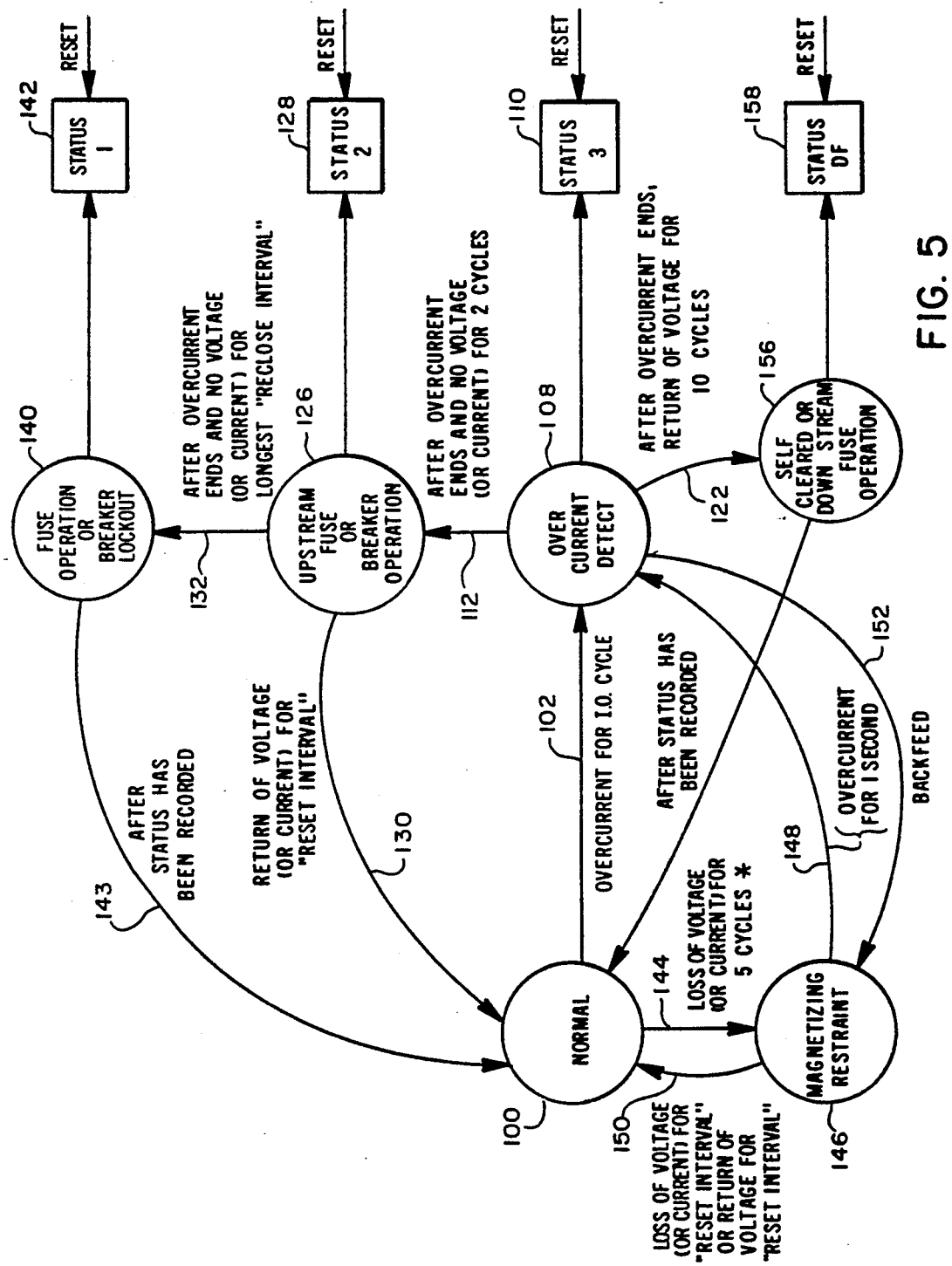
FIG. 5 is a state diagram illustrating the operation of the fault-detection method of the present invention for use in the fault detection unit of FIG. 1.

With reference to FIG. 5, an illustrative state diagram is shown for the FDU 10 that is suitable for the practice of the present invention to accomplish the fault-detection method. The fault detection method remains in the Normal State 100 until either of two conditions occur. When an Overcurrent Condition is satisfied at 102, the fault detection method moves to an Overcurrent Detect State 108, whereupon a priority Status Three indication is placed in memory to be stored for use by the communications protocol; i.e., for sending out the information when polled by the master station 30. The Status Three represented at 110 is retained until reset by the communications protocol function (either remotely, locally, or automatically—for example, by time lapse). In a specific embodiment, the Overcurrent Condition 102 requires the presence of an overcurrent in excess of a predetermined level for a specified time period such as one cycle of the waveform.

After the detection of the Status Three (in Overcurrent State 108), if the overcurrent ends and there is a loss of voltage which continues for a specified time period (e.g. 2 cycles), a Condition 112 is satisfied and the method moves to a Breaker Operation State 126

(which may also be generally referred to as a "Protective Device Operation" State). In the Breaker Operation State 126, a Status Two at 128 is placed in memory to be stored for use by the communications protocol; i.e., for sending out the information when polled by the master station 30. The Status Two indication at 128 is retained until reset by the communication protocol function (either remotely, locally, or automatically—for example, by time lapse).

On the other hand, if the voltage returns before the condition 112 is satisfied and the voltage is present for a specified time period (e.g. 10 cycles) without the presence of overcurrent, the Reset Condition 122 is satisfied and the method returns to the Normal State 100.

The method moves out of the Breaker Operation State 126 when a Reset Interval Condition 130 is satisfied or when a Reclose Interval Condition 132 is satisfied. If the return of voltage is present for a specified time period, the Reset Interval Condition 130 is satisfied and the method moves to the Normal State 100. The specified time period to satisfy the Condition 130 is selected based on the reset or memory time for the applicable upstream protective device; e.g., 10-180 seconds for typical reclosers. The reset or memory time is the time during which the recloser retains its counts.

Considering now additional functions of the method in the Breaker Operation State 126, if the voltage does not return for a specified period (i.e., Condition 130 is not met) when the Reclose Interval Condition 132 is satisfied—e.g., by the expiration of a specified time period—the method moves to a Lockout State 140 signifying the permanent operation or lockout state of the upstream protective device. A Status One at 142 is placed in memory to be stored for use by the communications protocol function; i.e., for sending out the Status One when polled by the master station 30. The Status One indication at 142 is retained until reset by the communication protocol function (remotely, locally, or automatically—for example, by time lapse). The specified time period to satisfy the Condition 132 is the longest reclosing interval between trip open and reclose of the upstream protective device; e.g., in a range of 1 to 600 seconds. After the Status One has been placed in memory, the method moves back to the Normal State 100 denoted by the Condition 143 being satisfied.

Considering other features of the fault detection method, in the Normal State 100, if a loss of current or voltage occurs for a specified time period (e.g. 5 cycles), for example, on the unfaulted phase for a single phase-to-ground fault, a Condition 144 is satisfied and the method moves to a Magnetizing Restraint State 146. In the Magnetizing Restraint State 146, if an overcurrent condition is present at the end of a specified time interval (e.g. one second), an Overcurrent Condition 148 is satisfied and the method moves to the Overcurrent State 108. Alternatively, if there is a loss of voltage or current for a reset time interval (as in the case of a locked out circuit) or if there is a return of voltage for the reset time interval before the Condition 148 is satisfied (as in the case of a successful reclosure), a Condition 150 is satisfied and the method returns to the Normal State 100. In this manner, false indications due to transformer magnetizing inrush current are avoided.

While the method is in the Overcurrent Detect State 108, if backfeed conditions are detected indicating the overcurrent is flowing from the load toward the source, a Backfeed Condition 152 is satisfied and the method moves to the Magnetizing Restraint State 146 for operation as discussed hereinbefore.

Considering now the operation of the method in response to a fault where the upstream protection device is a sectionalizer backed up by a recloser, if an overcurrent occurs, the method moves to the Overcurrent State 108 and stores a Status Three at 110. If the overcurrent condition ends and the voltage is lost for two cycles, the method moves to the Breaker Operation State 126 and a Status Two at 128 is also stored. If the fault is not cleared by the first reclose cycle of the recloser, the method remains in the Breaker Operation State 126 as the recloser opens and recloses a specified number of times in accordance with the reclosing sequence. However, during the reclosing sequence, the recloser does not stay open (reclose time) for a greater duration than the Reclose Interval Condition 132. When the sectionalizer opens during a reclose time interval of the recloser (according to the setting of the sectionalizer), the Reclose Interval Condition 132 is satisfied and the method moves to the Lockout State 140 where the Status One is indicated.

In a specific embodiment where no fuse-saving arrangement is present upstream of the FDU 10, the method includes a Downstream Fuse Operation State 156 that is achieved when the Condition 122 is satisfied. When the Condition 122 is satisfied, in the Downstream Fuse Operation State 156, a Status DF indication at 158 is placed in memory as discussed hereinbefore. After the Status DF has been recorded, the method returns to the Normal State 100.

The fault detection method of FIG. 5 is preferably independently operable at each FDU location for each phase and the neutral of the specific network. In a specific embodiment, the Overcurrent Condition 102 for the neutral is defined as the detection of the neutral current exceeding a predetermined setting and the phase currents each being in a normal range which is below a predetermined overcurrent value (e.g., 1200 amperes). This is especially useful where the neutral current is derived by the summing of the three-phase currents. Thus, the detection of a neutral fault is blocked or inhibited if any of the phase currents is in an overcurrent fault range. This is utilized when the purpose of the neutral fault detection is understood to be the detection of low current faults that are below the detection settings for the individual phase detection method.

Figure 6:
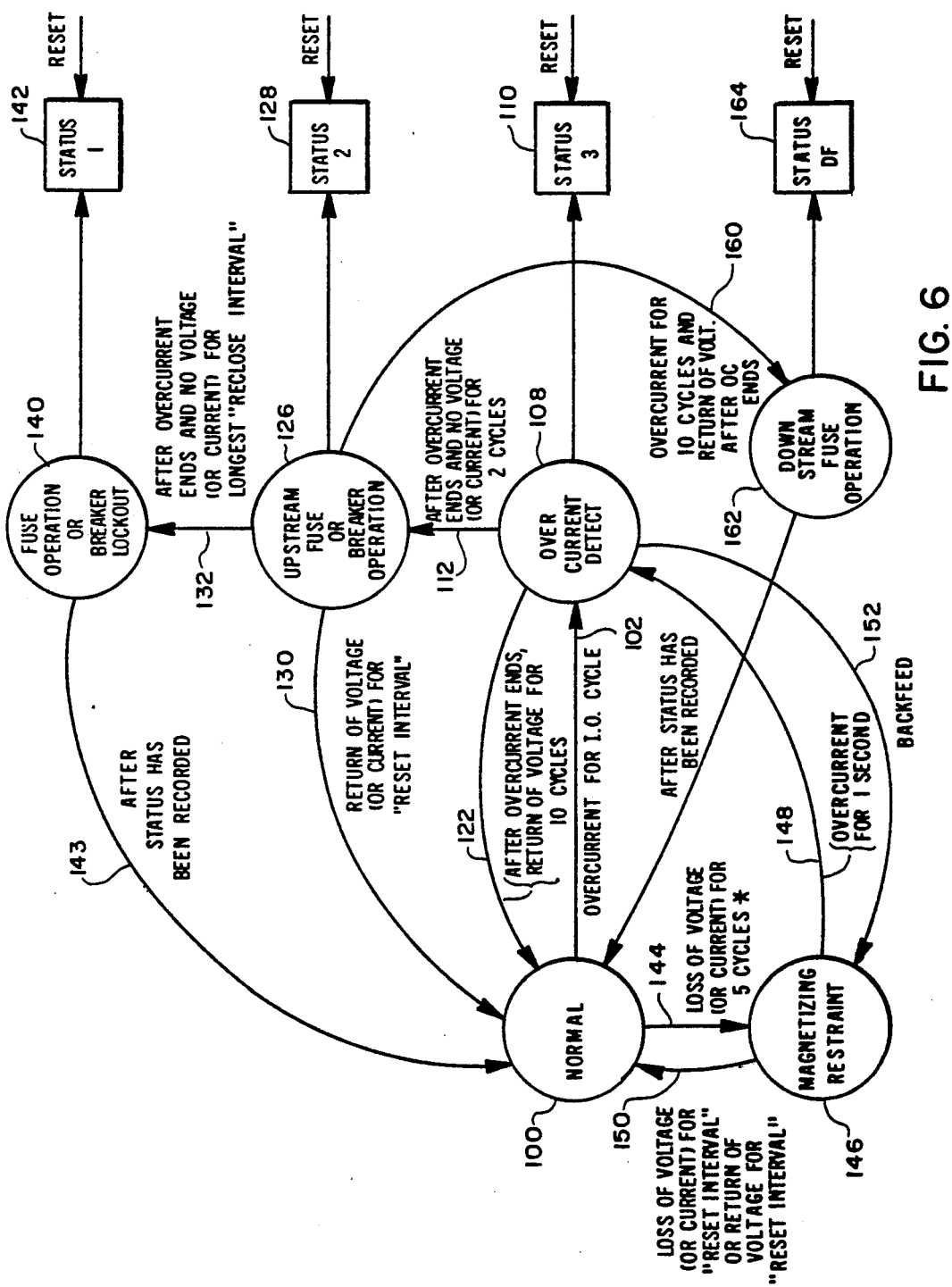
FIG. 6 is a state diagram illustrating an alternate form of the fault-detection method of FIG. 5.
Figure 7:
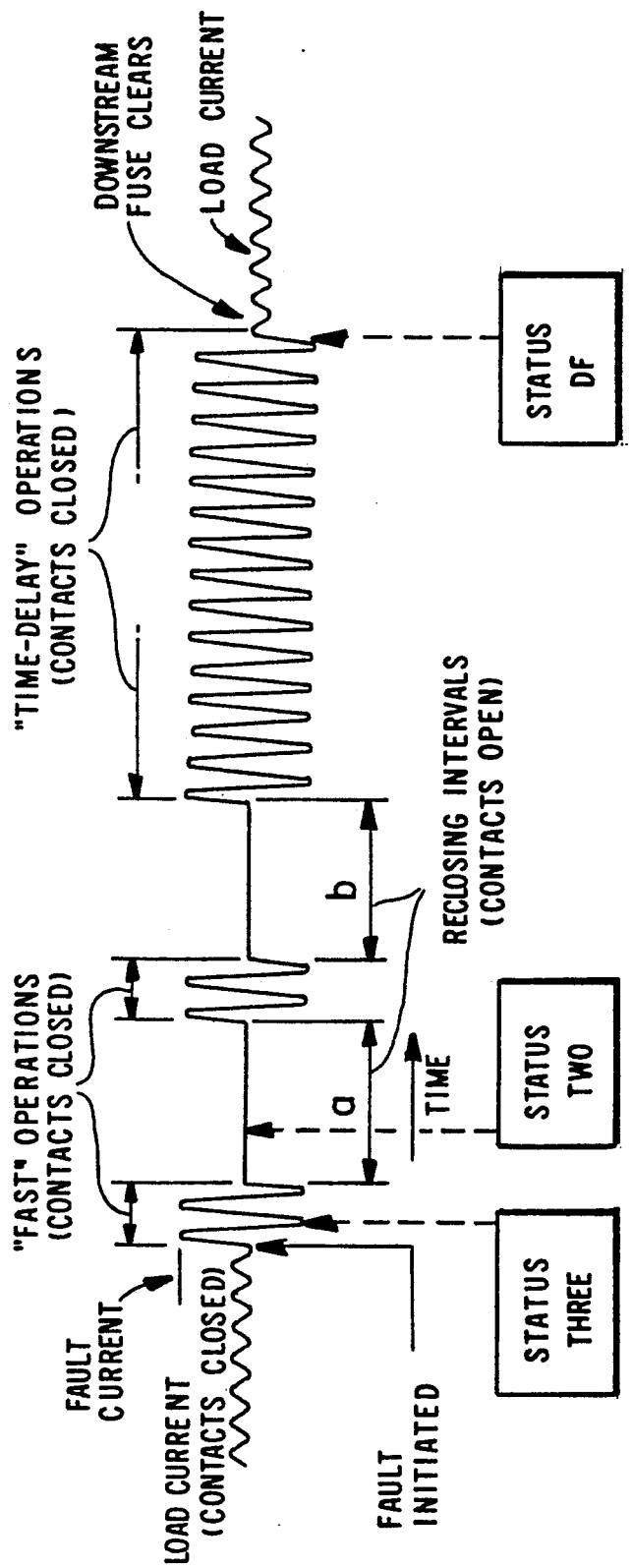
FIG. 7 is a diagrammatic representation illustrating the operation of the method of FIG. 6.

With reference now to FIGS. 6 and 7, an alternate form of the fault detection method of FIG. 5 is illustrated. Specifically, assume that the distribution network includes a fuse-saving arrangement where the upstream reclosers are set to operate in an instantaneous mode for the first one or two reclosing operations followed by a time-delay reclosing operation. In such a situation, a fault downstream of a fuse may be successfully cleared before the time-delay reclosing operation. In that case, the downstream fuse will not operate. Thus, the term "fuse-saving" is applied. For this type of situation, the FDU's 10 upstream of such a fuse are provided with an additional status DF signifying that a downstream fuse operation has occurred.

When a fault occurs downstream of the FDU 10, the fault-detection method of FIG. 6 (similarly to FIG. 5) moves through the Status Three and Status Two states in response to the detection of an overcurrent condition (Status Three) followed by the end of the overcurrent and the loss of voltage for the specified period. This resulting Status Two detection corresponds to the opening of the circuit by an upstream recloser. Accordingly, the method is in the Breaker Operation State 126 as the recloser opens and closes the circuit during the initial one or two instantaneous reclosing operations. If the fault is successfully cleared by the initial instantaneous reclosing operations, the method will return to the Normal State 100 after the Reset Interval Condition 130 is satisfied. However, if the fault is not cleared, when the recloser is in a time-delay reclosing operation, the downstream fuse now operates. Accordingly, a Condition 160 is satisfied by the occurrence of the presence of overcurrent for a specified time (e.g. 10 cycles) followed by the detection of the return of voltage condition after the overcurrent ends. When the Condition 160 is satisfied, the method moves to a Downstream Fuse Operation State 162 whereupon a Status DF indication at 164 is placed in memory to be stored for use by the communications protocol. The Status DF at 164 is retained until reset by the communications protocol function (either remotely, locally, or automatically—for example, by time lapse). After the detection and recording of the Status DF signifying downstream fuse operation, the method returns to the Normal State 100.

Considering other parameters and the versatility of the FDU 10, either single-phase or three-phase voltage sensing may be provided. In applications where the FDU location is monitoring an upstream fuse, if single-phase voltage sensing is utilized, the loss of current and the return of current conditions are utilized in the methods of FIGS. 5 and 6 rather than the aforementioned loss of voltage and return of voltage. Accordingly, the detection of faults on each phase may then be provided.

For reset of the Statuses One, Two and Three (110, 128 and 142), in addition to remote resetting via the master station 30, automatic resets may also be provided such as an automatic reset upon return of voltage or current for a time period, for example, ½ to 2 hours. This may also be implemented as an automatic reset, for example, on a time only basis after ½ to 2 hours, for Statuses One and Two, and automatic reset, for example, after 5–30 minutes, for Status Three.

In the alternative, a sequence of events arrangement may be provided that stores and time-marks (as a time-event log) a predetermined number (e.g. 128) of the most recent events. With the sequence of events arrangement, resetting is not required.

The following Table III is illustrative of suitable parameters and definitions to practice the present invention, the numbers in parenthesis referring to like-numbered conditions in FIGS. 5 and 6:

TABLE III

| | |
|---|---|
| Overcurrent (102) | A current value which exceeds the trip setting for longer than 1.0 cycle.<br>Range of setting:<br>Phase 200–1200 amperes<br>Neutral 100–1000 amperes<br>Setting is to match minimum trip current of upstream relay or fuse. |
| Loss of Current (144,150) | A condition which exists when the load current drops from a value that was 20% higher than the "loss of current" setting to a value that is less than the "loss of current" setting.<br>Range of setting: 2–50 amperes |
| Overcurrent Ends (112) | A condition which exists when the current drops from greater than the "overcurrent" setting to less than the "overcurrent" setting. |
| Return of Current (130) | A condition which exists when the phase current is 20% greater than the "loss of current" setting but not greater than the "overcurrent" setting. |
| Loss of Voltage (144,150) | A condition which exists when the voltage drops from greater than 85% of nominal to less than 10% of nominal. |
| Return of Voltage (122,130,150) | A condition which exists when the voltage is greater than 85% of nominal. |
| Reclosing Interval (132) | Time delay equal to the longest open circuit time between automatic opening and succeeding automatic reclose of the upstream protective device. Starts upon detection of "end of overcurrent" and "no voltage" and resets immediately when this condition is not met.<br>Range of setting: 1–600 seconds |
| No Voltage (112,132) | Voltage is less than 10% of nominal. |
| No Current (112,132) | Current is less than "loss of current" setting in amperes. |
| Reset Interval (130) | Time delay corresponding to that used to reset the reclosing operating sequence of the upstream breaker or recloser to its origin after a successful reclose. Starts when predetermined conditions are met and resets immediately when these conditions are not continuous. |
| Status One | Records that a breaker lockout or an upstream fuse operation has occurred and when it occurred. |
| Status Two | Records the operation of an upstream fault interrupting device and when it occurred. If the upstream fault interrupting device has automatic reclosing capability, only the first operation of the reclosing sequence is recorded. |
| Status Three | Records the occurrence of overcurrent independent of an operation of the upstream fault interrupting device. If the upstream fault interrupting device has automatic reclosing capability, only the first overcurrent of the reclosing sequence is recorded. |

Figure 8:
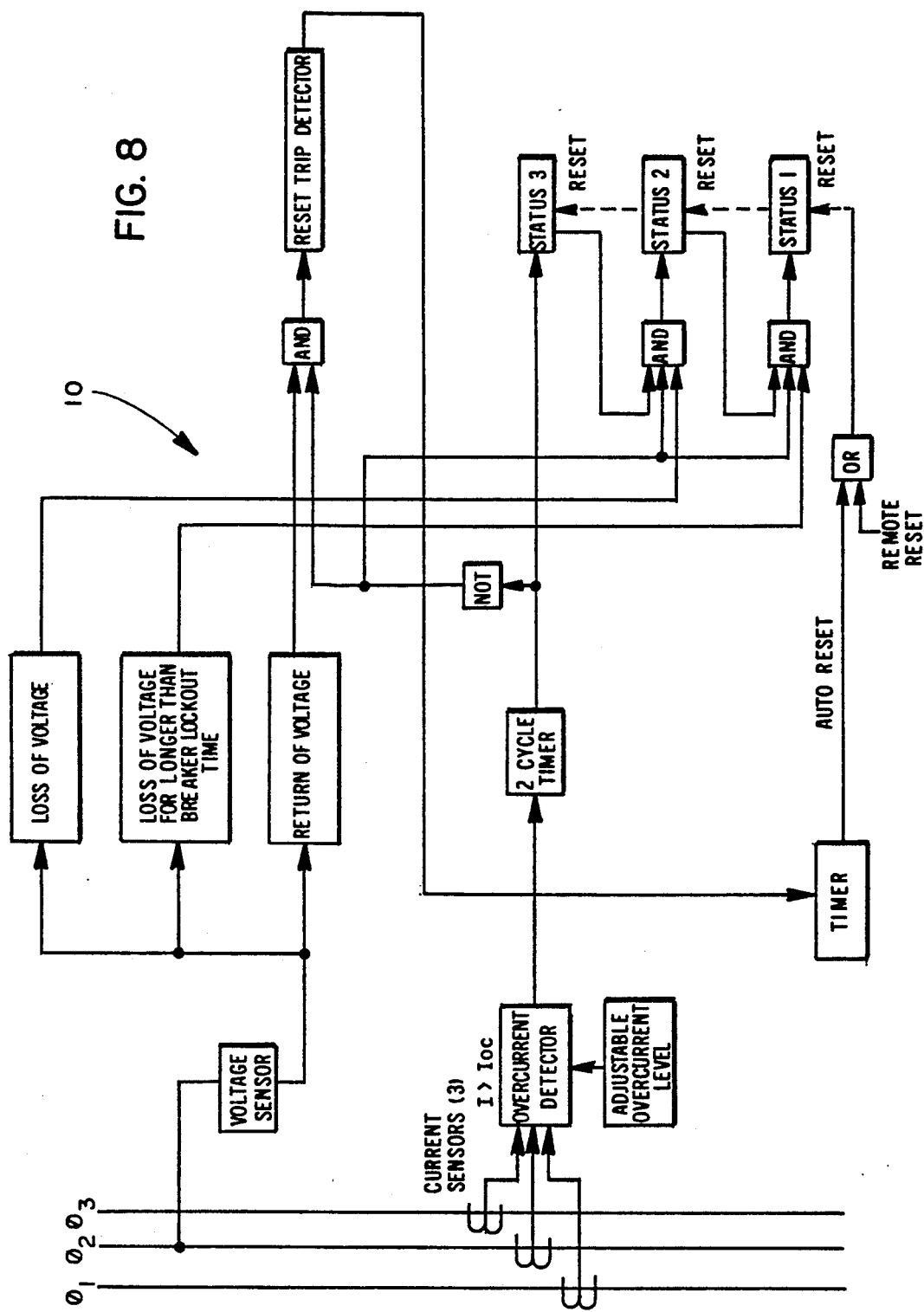
FIG. 8 is a block diagram representation of apparatus for implementing the fault-detection method of the present invention for the fault detection unit of FIG. 1.

The fault-detection methods of FIGS. 5 and 6 may each be conveniently implemented as a program under the control of a microprocessor, etc. Alternately, apparatus to implement the fault-detection method of FIG. 5 is illustrated in FIG. 8. As will be apparent to those skilled in the art, the functions of the fault detection unit 10 can be incorporated within the controller 15; i.e., the programs of FIGS. 5 and 6 or the implementation of FIG. 8 may be incorporated within the controller. Absent any difficulties in implementing the functions of the fault detection program within a controller, the incorporation is obviously advantageous in that separate microprocessors, etc. are not necessary.

While there have been illustrated and described various embodiments of the present invention, it will be apparent that various changes and modifications will occur to those skilled in the art. For example, as discussed hereinbefore, the various settings and conditions of FIGS. 5 and 6 may be adjusted, selected, or programmed (locally and/or remotely) to adapt to and coordinate with the particular characteristics of the upstream protective device or devices. Specifically, any or all of the Conditions 102, 112,132, 148, 202 and 206 may be time-current characteristics. Additionally, it should also be realized that the fault-detection methods of FIGS. 5 and 6 can be implemented in specific embodiments so as to accomplish the detection of one or more of the statuses in any combination without regard to the specific detection of the other(s). For example, Status One could be detected by the appropriate determination without regard to a separate step of detecting Status Two. Further, Status DF could be detected without regard to the separate detection of Statuses One, Two, or Three. Accordingly, it is intended in the appended claims to cover all such changes and modifications that fall within the true spirit and scope of the present invention.

What is claimed and desired to be secured by Letters Patent of the United States is:

1. An arrangement for detecting upstream protective device operations in an electrical circuit via the circuit conditions at a particular location of the circuit comprising:
   decision means responsive to predetermined circuit conditions at the particular location for providing at least first and second representations corresponding to the detection of respective first and second different types of operations of upstream protective devices, said first representation corresponding to a fault downstream of the particular location that causes operation of an upstream protective device that temporarily opens the circuit for a time interval that exceeds a first time duration, said second representation corresponding to a fault downstream of the particular location that causes operation of an upstream protective device that opens the circuit for a time interval that exceeds a second time duration greater than said first time duration, said decision means comprising first means for determining an occurrence of said first type of operation based an on occurrence of a predetermined overcurrent condition followed by a loss of a predetermined circuit parameter for said first time duration, said decision means further comprising second means for determining an occurrence of said second type of operation on the basis of a predetermined overcurrent condition followed by a loss of a predetermined circuit parameter for said second time duration.

2. The arrangement of claim 1 wherein said second means further comprises third means responsive to the determining of an occurrence of said first type of operation for continuing the timing of an loss of said predetermined circuit parameter unless said predetermined circuit parameter returns during the remainder of said first time duration for a third time duration whereupon said decision means is returned to a normal monitoring state.

3. The arrangement of claim 1 wherein said decision means further comprises third means for determining an occurrence of an overcurrent that exceeds a predetermined level for a predetermined third duration.

4. The arrangement of claim 1 further comprising selectively operable means for outputting said first and second representations.

5. The arrangement of claim 1 wherein said decision means further comprises backfeed detection means for inhibiting said first and second representations when predetermined backfeed conditions are detected indicative of a change in the direction of current.

6. The arrangement of claim 1 wherein said decision means further comprises restraint means for selectively delaying the operation of said first and second means when predetermined conditions are detected corresponding to circuit closing.

7. The arrangement of claim 1 wherein the predetermined overcurrent condition includes an overcurrent level that exceeds a predetermined level, the loss of said predetermined circuit parameter for said first time duration being started when the overcurrent ends.

8. The arrangement of claim 7 wherein the loss of said predetermined circuit parameter for said second time duration starts when the overcurrent ends.

9. The arrangement of claim 1 wherein the occurrence of said second type of operation is performed by the occurrence of said first type of operation followed by a continued loss of said predetermined circuit parameter for said second time duration.

10. The arrangement of claim 1 further comprising third means responsive to a return of said predetermined circuit parameter during the timing of either said first or second time duration for a third predetermined time duration for returning said decision means to a predetermined initial monitoring state.

11. The arrangement of claim 10 wherein said third predetermined time duration is different for the return of said predetermined circuit parameter during each of said first and second time durations.

12. The arrangement of claim 1 wherein the electrical circuit includes a plurality of phases, said decision means comprising means responsive to each phase for individually providing said first and second representations.

13. The arrangement of claim 12 wherein the electrical circuit includes a neutral, said decision means comprising means responsive to the neutral for providing said first and second representations.

14. The arrangement of claim 12 wherein the electrical circuit includes a neutral, said decision means further comprising third means for detecting overcurrent conditions in the neutral, said third means being responsive to the occurrence of a predetermined overcurrent condition and current in each of the phases being below a predetermined value.

15. A method of detecting protective device operation in an electrical circuit comprising:
   monitoring circuit parameters at predetermined points of the circuit; and
   determining operation of protective devices upstream of said predetermined points via the monitored circuit parameters, said determining step comprising detecting circuit-opening operation of an upstream protective device to provide first and second predetermined statuses, said first predetermined status corresponding to detecting circuit opening of a first predetermined type, said second predetermined status corresponding to detecting circuit-opening operation of a second predetermined type, said first predetermined status including a detection of a predetermined overcurrent condition followed by a loss of voltage and/or current, said second predetermined status including the detection of said first predetermined status and additionally a continued loss of voltage and/or current for an extended time duration.

16. The method of claim 15 wherein said second status is defined as being a higher status than said first status, the method comprising the step of selectively acquiring the highest status at each of said predetermined points.

17. The method of claim 15 wherein said determining step further comprises detecting predetermined overcurrent conditions to provide a third predetermined status.

18. The method of claim 17 further comprising a step of communicating information in a selective mode corresponding only to one or two of said three predetermined statuses.

19. The method of claim 15 wherein said extended time duration corresponds to a time interval t at is greater than a maximum temporary open time of an upstream protective device.

20. The method of claim 15 further comprising a step of acquiring information corresponding to protective device operation upstream of said predetermined points.

21. The method of claim 20 further comprising the step of utilizing said acquired information corresponding to protective device operation to determine a location of a fault in the electrical circuit.

22. The method of claim 21 wherein the electrical circuit includes a switch at one or more of said predetermined points, said method further comprising a step of remotely operating the switches in response to the fault location determined from said utilizing step.

23. The method of claim 15 wherein said predetermined overcurrent condition is defined by an occurrence of an overcurrent level that exceeds a predetermined current level followed by the current falling below the predetermined current level.

24. A method of detecting first and second types of operation of an upstream protective device in an electrical circuit comprising:
detecting the occurrence of a predetermined overcurrent condition and an end of the predetermined overcurrent condition;
determining after the end of the predetermined overcurrent condition a loss of a predetermined circuit parameter for a first predetermined time duration to establish the first type of operation of the protective device; and
thereafter continuing to monitor a continued loss of the predetermined circuit parameter for a second predetermined time duration to establish the second type of operation of the protective device, the predetermined overcurrent condition comprising the occurrence of an overcurrent level greater than a predetermined level for a third predetermined time duration.

25. The method of claim 24 wherein said monitoring further comprises detecting a return of the predetermined circuit parameter during said monitoring for the second type of operation, upon detection of the return of the predetermined circuit parameter said method further comprising timing a continuation of the predetermined circuit parameter for a third predetermined time duration to establish a return to a normal mode for performance of said detecting step.

26. The method of claim 24 further comprising providing data representing that the first type of operation has been established, the second type of operation has been established, and/the occurrence of the predetermined overcurrent condition has been detected.

27. The method of claim 24 wherein the second type of operation, the first type of operation, and the detection of the predetermined overcurrent condition are prioritized as three statuses in the foregoing order of highest to lowest priority, the method further comprising providing data representing the highest status.

28. An arrangement for detecting first and second types of operation of upstream protective devices in an electrical circuit comprising:
means for detecting the occurrence of a predetermined overcurrent condition and the end of the predetermined overcurrent condition; and
means for determining after the end of the overcurrent condition the loss of voltage and/or current to establish the first type of operation of an upstream protective device and for determining after the end of the overcurrent condition the loss of voltage and/or current for a first predetermined time duration to establish the second type of operation of upstream protective devices, said determining means further comprising means responsive after the establishing of the first type of operation to establish a downstream device operation in response to the detection of a predetermined overcurrent level for a second predetermined time duration followed by a detection of predetermined voltage conditions.

29. The arrangement of claim 28 further comprising means responsive to said determining means for retaining information representing said first and second types of operation.

30. The arrangement of claim 29 wherein said retaining means further comprises means responsive to the detecting means for retaining information representing the occurrence of said predetermined overcurrent condition.

31. The arrangement of claim 28 wherein said first type of operation represents any upstream opening of the circuit and said second type of operation represents permanent opening of the circuit.

32. A method for detecting downstream protective device operation in an electrical circuit via the circuit conditions at a particular location of the circuit comprising
detecting a first predetermined overcurrent condition;
detecting a second condition including a loss of voltage and/or current after an end of said first predetermined overcurrent condition;
detecting in response to said second condition a third predetermined overcurrent condition; and
detecting after the end of said third predetermined overcurrent condition an presence of a predetermined voltage condition.

33. The method of claim 32 wherein said third predetermined overcurrent condition includes an occurrence of a current level that exceeds a predetermined level for a predetermined time duration.

34. The method of claim 33 wherein said predetermined voltage condition is defined to establish an presence of normal circuit voltage.

35. The method of claim 24 further comprising the step of detecting after the end of the predetermined overcurrent condition a presence of voltage to establish clearing of a fault condition.

36. An arrangement for detecting upstream protective device operations in an electrical circuit via the circuit conditions at a particular location of the circuit comprising:
decision means responsive to predetermined circuit conditions at the particular location for providing at least first and second representations corresponding to a detection of respective first and second different types of operations of upstream protective devices, said first representation corresponding to a fault downstream of the particular location that causes operation of an upstream protective device that temporarily opens the circuit for a time interval that exceeds a first time duration, said second representation corresponding to a fault downstream of the particular location that causes operation of an upstream protective device that opens the circuit for a time interval that exceeds a second time duration greater than said first time duration, said decision means comprising first means for determining an occurrence of said first type of operation based on an occurrence of a predetermined overcurrent condition followed by a loss of a predetermined circuit parameter for said first time duration, said decision means further comprising second means for determining an occurrence of said second type of operation on the basis of a predetermined overcurrent condition followed by a loss of a predetermined circuit parameter for said second time duration, said decision means further comprising third means responsive to a return of said predetermined circuit parameter during the timing of either said first or second time duration for a third predetermined time duration for returning said decision means to a predetermined initial monitoring state, said third predetermined time duration being different for the return of said predetermined circuit parameter during each of said first and second time durations.

37. An arrangement for detecting upstream protective device operations in an electrical circuit via the circuit condition at a particular location of the circuit comprising:
decision means responsive to predetermined circuit conditions at the particular location for providing at least first and second representations corresponding to a detection of respective first and second different types of operations of upstream protective devices, said first representation corresponding to a fault downstream of the particular location that causes operation of an upstream protective device that temporarily opens the circuit for a time interval that exceeds a first time duration, said second representation corresponding to a fault downstream of the particular location that causes operation of an upstream protective device that opens the circuit for a time interval that exceeds a second time duration greater than said first time duration, said decision means comprising first means for determining an occurrence of said first type of operation based on an occurrence of a predetermined overcurrent condition followed by a loss of a predetermined circuit parameter for said first time duration, said decision means further comprising second means for determining an occurrence of said second type of operation on the basis of a predetermined overcurrent condition followed by a loss of a predetermined circuit parameter for said second time duration, the electrical circuit further including a plurality of phases, said decision means comprising means responsive to each phase for individually providing said first and second representations, the electrical circuit further including a neutral, said decision means comprising means responsive to the neutral for providing said first and second representations.

38. A method of detecting first and second types of operation of an upstream protective device in an electrical circuit comprising:
detecting the occurrence of a predetermined overcurrent condition and an end of the predetermined overcurrent condition;
determining after the end of the predetermined overcurrent condition a loss of a predetermined circuit parameter for a first predetermined time duration to establish the first type of operation of the protective device;
thereafter continuing to monitor a continued loss of the predetermined circuit parameter for a second predetermined time duration to establish the second type of operation of the protective device; and
providing second data when said second type of operation has been established, and providing first data when said first type of operation has been established provided that said second type of operation has not been established.

39. A method of detecting first and second types of operation of an upstream protective device in an electrical circuit comprising:
detecting the occurrence of a predetermined overcurrent condition and an end of the predetermined overcurrent condition;
determining after the end of the predetermined overcurrent condition a loss of a predetermined circuit parameter for a first predetermined time duration to establish the first type of operation of the protective device;
thereafter continuing to monitor a continued loss of the predetermined circuit parameter for a second predetermined time duration to establish the second type of operation of the protective device; and
thereafter detecting a predetermined overcurrent for a third predetermined time duration and a presence of voltage after an end of the predetermined overcurrent to establish a downstream device operation.

40. A method of detecting first and second types of operation of an upstream protective device in an electrical circuit comprising:
detecting the occurrence of a predetermined overcurrent condition and an end of the predetermined overcurrent condition;
determining after the end of the predetermined overcurrent condition a loss of a predetermined circuit parameter for a first predetermined time duration to establish the first type of operation of the protective device; and
thereafter continuing to monitor a continued loss of the predetermined circuit parameter for a second predetermined time duration to establish the second type of operation of the protective device, said first type of operation being a temporary opening of the circuit by a protective device and said second type of operation being a permanent opening of the circuit.

41. A method of detecting first and second types of operation of an upstream protective device in an electrical circuit comprising:
detecting the occurrence of a predetermined overcurrent condition and an end of the predetermined overcurrent condition;
determining after the end of the predetermined overcurrent condition a loss of a predetermined circuit parameter for a first predetermined time duration to establish the first type of operation of the protective device; and thereafter continuing to monitor a continued loss of the predetermined circuit parameter for a second predetermined time duration to establish the second type of operation of the protective device, said second predetermined time duration being greater than the maximum temporary open time of an upstream protective device.

42. A method of detecting first and second types of operation of an upstream protective device in an electrical circuit comprising:

detecting the occurrence of a predetermined overcurrent condition and an end of the predetermined overcurrent condition;

determining in response to the detecting of the end of the predetermined overcurrent condition a continuous absence of a predetermined circuit parameter throughout a first predetermined time duration to establish the first type of operation of the protective device; and thereafter continuing to monitor a continued absence of the predetermined circuit parameter throughout a second predetermined time duration to establish the second type of operation of the protective device.

* * * * *

UNITED STATES PATENT AND TRADEMARK OFFICE
CERTIFICATE OF CORRECTION

PATENT NO. : 5,303,112

DATED : Apr. 12, 1994

INVENTOR(S) : John A. Zulaski et al

It is certified that error appears in the above-indentified patent and that said Letters Patent is hereby corrected as shown below:

Claim 19, col. 13, line 10 "t at" should be -- that --;
Claim 21, col. 13, line 16, "the" (second occurrence) should be -- a --;
Claim 26, col. 13, line 61, "and/the" should be -- and the --;
Claim 32, col. 14, lines 37 and 38, "comprising" should be
-- comprising: -- (insert colon);
Claim 32, col. 14, line 47, "an" should be -- a --;
Claim 34, col. 14, line 54, "an" should be -- a --.

Signed and Sealed this

Fourth Day of October, 1994

Attest:

BRUCE LEHMAN

*Attesting Officer*  *Commissioner of Patents and Trademarks*